United States Patent [19]

Asada

[11] Patent Number: 5,087,233

[45] Date of Patent: Feb. 11, 1992

[54] DUPLICATE TORQUE-TRANSMITTING CONNECTION BETWEEN ROTARY MEMBERS AND SHAFT MEMBERS IN TRANSMISSION

[75] Inventor: Toshiyuki Asada, Susono, Japan

[73] Assignee: Toyota Jidosha Kabushiki Kaisha, Toyota, Japan

[21] Appl. No.: 518,414

[22] Filed: May 3, 1990

[30] Foreign Application Priority Data

May 10, 1989 [JP] Japan .................. 1-116298

[51] Int. Cl.$^5$ .......................................... F16H 57/10
[52] U.S. Cl. ................... 475/278; 192/85 AA;
  192/48.8; 475/285; 475/289
[58] Field of Search .................. 74/330; 475/346, 275,
  475/277, 278, 284, 285, 288, 289, 292, 312, 324;
  192/85 AA, 87.11, 48.8

[56] References Cited

U.S. PATENT DOCUMENTS

| | | | |
|---|---|---|---|
| 2,825,245 | 3/1958 | Hobbs | 475/278 |
| 3,043,163 | 7/1962 | Hobbs | 475/277 X |
| 3,115,793 | 12/1963 | Hobbs | 475/277 |
| 3,596,537 | 8/1971 | Koivunen | 192/85 AA X |
| 3,848,518 | 11/1974 | Martin | 192/85 AA X |
| 3,964,584 | 6/1976 | Bucksch | 192/87.11 |
| 4,225,026 | 9/1980 | Yamamori et al. | 192/85 AA |
| 4,395,925 | 8/1983 | Gaus | 475/284 X |
| 4,450,944 | 5/1984 | Fujioka | 192/85 AA X |
| 4,660,439 | 4/1987 | Hiraiwa | 475/277 X |

FOREIGN PATENT DOCUMENTS

| | | |
|---|---|---|
| 54-132058 | 10/1979 | Japan . |
| 60-57036 | 4/1985 | Japan . |
| 60-65942 | 4/1985 | Japan . |
| 60-65943 | 4/1985 | Japan . |
| 60-88249 | 5/1985 | Japan . |
| 60-88251 | 5/1985 | Japan . |
| 60-88252 | 5/1985 | Japan . |
| 2108219 | 5/1983 | United Kingdom .......... 192/85 AA |

*Primary Examiner*—Allan D. Herrmann
*Assistant Examiner*—Benjamin Levi
*Attorney, Agent, or Firm*—Oblon, Spivak, McClelland, Maier & Neustadt

[57] ABSTRACT

A first and a second rotary member such as outside or inside clutch member arranged as axially juxtaposed and radially expanded to rotate individually about a common axis in a transmission for a vehicle are separately torque-transmittingly connected with a first shaft member and a hollow second shaft member coaxially and telescopingly disposed around the first shaft member to be respectively in an individually torque-transmitting relationship by first external splines formed at an outer periphery of an end portion of the first shaft member axially extending out of an open end of the second shaft member being axially placed into engagement with first internal splines formed at an inner periphery of a central bore formed in the first rotary member, while second external splines formed at an outer periphery of an end portion of the second shaft member adjacent the open end thereof are axially placed into engagement with second internal splines formed at an inner periphery of a central bore formed in the second rotary member.

19 Claims, 2 Drawing Sheets

DUPLICATE TORQUE-TRANSMITTING CONNECTION BETWEEN ROTARY MEMBERS AND SHAFT MEMBERS IN TRANSMISSION

BACKGROUND OF THE INVENTION

1. Field of the Invention

The present invention relates to a transmission for a vehicle such as an automobile and, more particularly, to a torque-transmitting connection between a rotary member such as an outside or an inside clutch member and a shaft member in the transmission mechanism of the vehicle transmission.

2. Description of the Prior Art

A transmission mechanism including three planetary gear assemblies and a relatively large number of clutches, brakes and one way clutches and adapted to be able to provide a large number (such as five) of forward speed stages and a reverse stage has been proposed in various constructions in the schematic illustration as shown, for example, in Japanese Patent Laying-open Publications 54-132058, 60-57036, 60-65942, 60-65943, 60-88249, 60-88251 and 60-88252 and U.S. Pat. Nos. 4,233,861 and 4,660,439. However, it would not be always guaranteed that the transmission mechanism in such a schematic configuration is actually desirable or even practically constructible.

SUMMARY OF THE INVENTION

It is therefore a general object of the present invention to provide a transmission mechanism for a vehicle to be dependent upon a combination of three planetary gear assemblies for providing various speed stages in an actually conveniently constructible construction.

When three planetary gear assemblies are combined to provide various reduction gear ratios between an input rotary member and an output rotary member, a general configuration of the overall transmission mechanism tends to be relatively elongated so as to be small in its diameter as compared with its axial length. In such an elongated construction it is generally convenient that the internal torque-transmitting mechanisms are assembled according to axial shifting of construction elements.

In view of the above it is a more particular object of the present invention to provide a duplicate torque-transmitting connection for connecting a first and a second rotary member axially juxtaposed and radially expanded to rotate individually about a common axis with a first shaft member and a hollow second shaft member coaxially and telescopingly disposed around said first shaft member to be respectively in an individually torque-transmitting relationship in a transmission for a vehicle.

According to the present invention, the above-mentioned particular object is accomplished by such first and second rotary members being individually torque transmittingly connected with such first and second shaft members according to coupling means comprising first external splines formed at an outer periphery of an end portion of said first shaft member axially extending out of an open end of said second shaft member, first internal splines formed at an inner periphery of a central bore formed in said first rotary member and engaged with said first external splines in an axial shifting relative thereto, second external splines formed at an outer periphery of an end portion of said second shaft member adjacent said open end thereof, and second internal splines formed at an inner periphery of a central bore formed in said second rotary member and engaged with said second external splines in an axial shifting relative thereto.

In the duplicate torque-transmitting connection according to the above-mentioned construction, said first rotary member may have a cylindrical hub portion extending toward said second shaft member so as to substantially axially to align thereto and oppose said open end of said second shaft member.

Further, said hub portion of said first rotary member may have an outer diameter smaller than an outer diameter of said second shaft member, and said second rotary member has a cylindrical hub portion extending in the same direction as said hub portion of said first rotary member so that said second rotary member is in the spline engagement with said second shaft member at a part of said hub portion thereof closer to a tip end thereof, while a root portion of said second rotary member axially opposite to said tip end of said hub portion thereof extends out of said open end of said second shaft member and telescopingly overlying a tip end portion of said hub portion of said first rotary member.

Still further, said hub portion of said second rotary member may be formed with said internal splines only at an axial portion which overlies said second shaft member.

Still further, said hub portion of said second rotary member may have an inner diameter at said axial portion thereof where said internal splines are formed which is smaller than an inner diameter at said root portion thereof extending out of said open end of said second shaft member as much as an amount substantially corresponding to two times of radial height of said internal splines thereof.

The duplicate torque-transmitting connection according to the present invention may desirably be incorporated in a transmission which comprises an input rotary member, an output rotary member, a first planetary gear assembly having a first sun gear, a first ring gear, a first set of planetary pinions meshing with both said first sun gear and said first ring gear, and a first carrier supporting said first planetary pinions, a second planetary gear assembly having a second sun gear, a second ring gear, a second set of planetary pinions meshing with both said second sun gear and said second ring gear, and a second carrier supporting said second planetary pinions, a third planetary gear assembly having a third sun gear, a third ring gear, a third set of planetary pinions meshing with both said third sun gear and said third ring gear, and a third carrier supporting said third planetary pinions, a first connecting member for torque-transmittingly connecting said first carrier with said third ring gear, a second connecting member for torque-transmittingly connecting said second ring gear with said third carrier, a third connecting member for torque-transmittingly connecting said second carrier with said third sun gear, a first clutch for selectively torque-transmittingly connecting said input rotary member with said first ring gear, a second clutch for selectively torque-transmittingly connecting said input rotary member with said first sun gear, a third clutch for selectively torque-transmittingly connecting said first sun gear with said second carrier as well as said third sun gear, a fifth clutch for selectively torque-transmittingly connecting said first sun gear with said second carrier as well as said third sun gear, a fourth clutch for selectively torque-transmittingly connecting said input rotary member with said second sun gear in series with said second clutch, a first brake for selectively braking rotation of said second carrier as well as said third sun gear, and a second brake for selectively braking rotation of said second sun gear, said output rotary member being torque-transmittingly connected with said second ring gear as well as said third carrier, said first shaft serving for torque-transmittingly connecting said first sun gear with said second carrier as well as said third sun gear through said third clutch, said second shaft member serving for torque-transmittingly connecting said first sun gear with said second carrier as well as said third sun gear through said fourth clutch.

In such a transmission said first shaft member may be a hollow shaft, and said first connecting member is passed through said first shaft member. Said second and third planetary gear assemblies may be positioned on a first axial side of said first planetary gear assembly remote from said input rotary member and close to said output rotary member with said first and second clutches being on an axial side of said first planetary gear assembly remote from said second and third planetary gear assemblies while said third, fourth and fifth clutches and said first and second brakes are positioned axially between said first planetary gear assembly and a combination of said second and third planetary gear assemblies. Further, a first transverse support wall member may be provided between said third clutch and said fourth clutch for rotationally supporting said second shaft member. Further, a hollow third shaft member may be provided as coaxially and telescopingly disposed around said first shaft member as axially shifted from said second shaft member and serving for torque-transmittingly connecting said input rotary member with said second sun gear in series with said second shaft member through said second and fifth clutch. Further, a second transverse support wall member may be provided between said first brake and said second brake for rotationally supporting said third shaft member.

Said first shaft member may be assembled of a first tubular element axially positioned to pass through said first support wall member and a second tubular element axially positioned to pass through said second support wall member, said first and second tubular elements being torque-transmittingly joined together at adjacent ends thereof.

Further, a first one way clutch may be provided so as to brake rotation of said second carrier as well as said third sun gear in one rotational direction thereof. In this structure, said first one way clutch may have an inner race member which is supported by said second transverse support wall member. Further, a second one way clutch may also provided between said fourth clutch and said first shaft member so as to allow transmittance of torque between said first sun gear and said second carrier as well as said third sun gear when said fourth clutch is engaged only in one relatively rotational direction therebetween, said second one way clutch being axially positioned between said first and second transverse support wall members.

The above-mentioned first and second tubular elements may be joined together at an axial position thereof axially overlapping with said second one way clutch so that said adjacent ends of said first and second tubular elements are telescoped with one another and an inner race member of said second one way clutch is engaged around an outer layer of the telescoped ends of said first and second tubular elements.

In the above-mentioned transmission a third one way clutch may also be provided so as torque-transmittingly to connect said first sun gear with said second sun gear only in one relatively rotational direction therebetween, said third one way clutch being axially positioned between said first and second transverse support wall members. Further, the above-mentioned transmission may comprise a housing having an integral axial end wall and open at another axial end, and all construction members thereof comprised herein are adapted to be assembled into said housing according to axial shifting thereof in said housing from said open axial end thereof toward said integral axial end thereof. In this construction said integral axial end may be formed with a central opening for allowing said output rotary member to pass therethrough from an inside space of said housing to an outside thereof, said central opening serving to rotationally support said output rotary member, said output rotary member being formed with an axial bore portion serving as a bearing opening for rotationally supporting a first end portion of said first connecting member.

In this construction said open end of said housing may be closed with an end cap member formed with a central opening for allowing said input rotary member to pass therethrough from an outside of said housing to an inside space thereof as rotationally supported thereby, and said input rotary member is formed with an axial bore portion serving as a bearing opening for rotationally supporting a second end portion of said first connecting member opposite to said first end portion thereof.

BRIEF DESCRIPTION OF THE DRAWINGS

In the accompanying drawings.

DESCRIPTION OF THE PREFERRED EMBODIMENTS

In the following the present invention will be described with respect to some preferred embodiments thereof with reference to the accompanying drawings.

Figure 1:
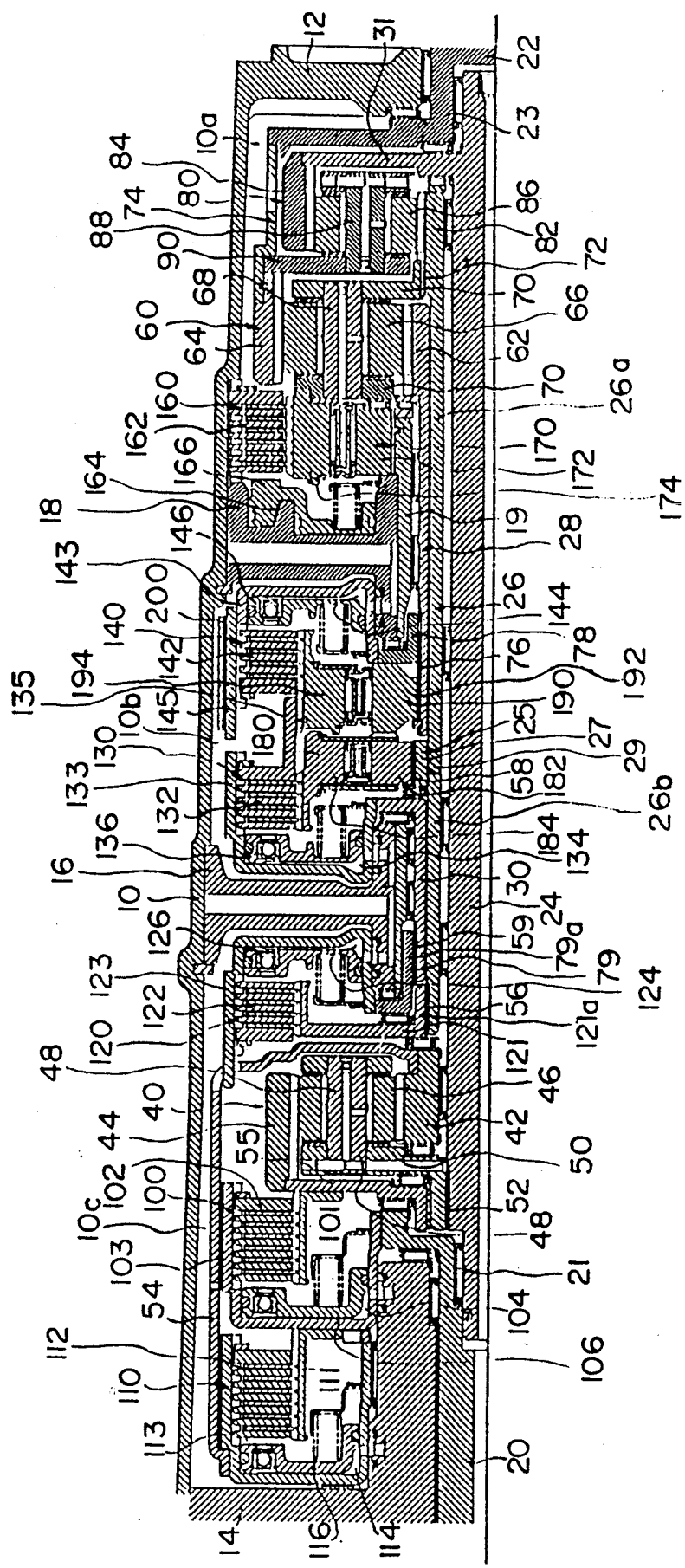
FIG. 1 is a longitudinal section of a transmission for a vehicle such as an automobile in which the present invention is incorporated in the form of an embodiment.

Referring to FIG. 1, the transmission herein shown comprises a housing 10 having an integral axial end wall 12 and open at another axial end closed by an end cap 14. Two disk type intermediate wall members 16 and 18 are fixedly mounted in the housing as spaced along the longitudinal axis thereof so as thereby to define three chamber spaces 10a, 10b and 10c within the housing 10.

An input shaft 20 is rotatably supported by the end cap 14, while an output shaft 22 is rotatably supported by the end wall 12. The input shaft 20 is formed with an internal bearing portion 21, while the output shaft 22 is formed with an internal bearing portion 23, and a first intermediate shaft 24 is rotatably supported at opposite ends thereof by the internal bearing portions 21 and 23. A second intermediate shaft 26 formed as a hollow shaft member is mounted to be rotatable around the first intermediate shaft 24. Further, a third intermediate shaft 28 and a fourth intermediate shaft 30, both being formed as hollow shaft members, are rotatably mounted around the second intermediate shaft 26 as axially displaced from one another. The second intermediate shaft 26 is an assembly of two shaft member 26a and 26b torque-transmittingly joined at an intermediate telescoping portion 25 thereof, where the shaft member 26b is formed with an expanded end portion 27 in which an end portion 29 of the shaft member 26a is received so that the two shaft members are joined together by such telescoping engagement. The internal peripheral portion of the expanded end portion 27 of the shaft member 26b and the outer peripheral portion of the end portion 29 of the shaft member 26a are formed with splines for mutual spline engagement. Therefore, the two shaft members 26a and 26b are readily assembled together so as to operate as a torque-transmitting shaft when the end portion 29 is only inserted into the expanded end portion 27.

A first planetary gear assembly 40 is mounted in the space chamber 10c and comprises a sun gear 42 mounted around the first intermediate shaft 24 to be freely rotatable therearound, a ring gear 44 arranged to be coaxial with the sun gear 42, a plurality of planetary pinions 46 (only one of them is shown in the figure) meshing with the sun gear 42 and the ring gear 44, and a carrier 50 supporting the planetary pinions 46 via shafts 48 (also only one is shown) to be rotatable about their own axes. The carrier 50 is mounted to one end portion of the first intermediate shaft 24 by a spline engagement 52 so that torque is transmitted therebetween.

The ring gear 44 is selectively connected with the input shaft 20 in a torque-transmitting relation via a first clutch 100. The clutch 100 comprises an inside clutch member 101 firmly connected with the ring gear 44, an outside clutch member 103 firmly connected with the input shaft 20, a set of multi-clutch plate elements 102 including a first group of plate elements torque transmittingly connected with the inside clutch member 101 and a second group of plate elements torque transmittingly connected with the outside clutch member 103, and a servo actuating construction including a servo pressure chamber 104 and a servo piston 106. The first clutch 100 is engaged when the servo piston 106 is driven rightward in the figure.

The sun gear 42 is selectively connected with the input shaft 20 via a connecting member 54 and a second clutch 110 according to selective engagement of the second clutch 110. The clutch 110 comprises an inside clutch member 111 firmly connected with the input shaft 20 as well as the outside clutch member 103 of the first clutch 100, an outside clutch member 113 connected with the sun gear 42 of the planetary gear assembly 40 via the connecting member 54 a set of multi-clutch plate elements 112 including a first group of plate elements torque transmittingly connected with the inside clutch member 111 and a second group of plate elements torque transmittingly connected with the outside clutch member 113, and a servo actuating construction including a servo pressure chamber 114 and a servo piston 116. This second clutch 110 is engaged when the servo piston 116 is driven rightward in the figure.

A second planetary gear assembly 60 and a third planetary gear assembly 80 are provided in the chamber space 10a. The second planetary gear assembly 60 comprises a sun gear 62 formed as an integral portion of the third intermediate shaft 28 at one end portion thereof, a ring gear 64 disposed to be coaxial with the sun gear 62, a plurality of planetary pinions 66 (only one is shown in the figure) meshing with the sun gear 62 and the ring gear 64, and a carrier 70 rotatably supporting the planetary pinions 66 via shafts 68 (also one is shown). The carrier 70 is mounted to the second intermediate shaft 26 via a spline engagement portion 72 on the one hand, while on the other hand it is also connected with an outer race 174 of a one way clutch 170. The ring gear 64 is connected with the output shaft 22 via a connecting member 74.

The one way clutch 170 further comprises an inner race 172 fixed to a sleeve member 19 which is firmly supported from the intermediate wall member 18. The outer race 174 of the one way clutch 170 can rotate relative to and around the inner race 172 only in one rotational direction and is further locked against rotation in both directions by a first brake 160 which comprises a set of multi-plate elements 162 including a first group of plate elements torque transmittingly connected with an axial extension of the intermediate wall member 18 and a second group of plate elements torque transmittingly connected with the outer race 174, and a servo actuating construction including a servo pressure chamber 164 and a servo piston 166. The first brake 160 is engaged when the servo piston 166 is driven rightward in the figure.

The third planetary gear assembly 80 comprises a sun gear 82 formed as an integral part of the second intermediate shaft 26 at one end portion thereof, a ring gear 84 disposed to be in coaxial relation with the sun gear 82, a plurality of planetary pinions 86 (only one is shown in the figure) meshing with the sun gear 82 and the ring gear 84, and a carrier 90 rotatably supporting the planetary pinions 86 via shafts 88 (also only one is shown). The carrier 90 is connected with the ring gear 64 of the second planetary gear assembly 60 and also with the output shaft 22 via the above-mentioned connecting member 74. The ring gear 84 is connected with the first intermediate shaft 24 at a flange portion 31 formed at one end thereof. Thus the carrier 50 of the first planetary gear assembly 40 is connected with the ring gear 84 of the third planetary gear assembly 80 via the first intermediate shaft 24.

The second intermediate shaft 26 is selectively connected with the above-mentioned connecting member 54 via a third clutch 120 which comprises an inside clutch member 121 mounted to a left side end of the second intermediate shaft 26 as viewed in the figure at its hub potion 121a in a torque-transmitting relation by a spline engagement 56, an outside clutch member 123 torque transmittingly engaged with the above-mentioned connecting member 54, a set of multi-clutch plate elements 122 including a first group of plate elements torque transmittingly connected with the inside clutch member 121 and a second group of plate elements torque transmittingly connected with the outside clutch member 123, and a servo actuating construction including a servo pressure chamber 124 and a servo piston 126. The clutch 120 is engaged when the servo piston 162 is driven leftward in the figure.

A second one way clutch 180 is provided in the chamber space 10b so as to comprise an inner race 182 mounted on the expanded portion 27 of the shaft member 26b forming a part of the second intermediate shaft 26 as torque-transmittingly engaged by splines 58 and an outer race 184 adapted to be selectively connected with the fourth intermediate shaft 30 via a fourth clutch 130 and also adapted to be selectively connected with the third intermediate shaft 28 so as to be torque transmittingly connected with the sun gear 62 of the third planetary gear assembly 60 via a series connection of the fourth clutch 130 and a fifth clutch 140 mediated by an outer race 194 of a third one way clutch 190 both described hereinunder.

The fourth clutch 130 comprises an outside clutch member 133 connected with the fourth intermediate shaft 30, an inner clutch member integrally provided by the above-mentioned outer race 184 of the one way clutch 180, a set of multi-clutch plate elements 132 including a first group of plate elements torque transmittingly connected with the outside clutch member 133 and a second group of plate elements torque transmittingly connected with the outer race 184, and a servo actuating construction including a servo pressure chamber 134 and a servo piston 136. The fourth clutch 130 is engaged when the servo piston 136 is driven rightward in the figure. The outside clutch member 133 is torque-transmittingly connected with the outer race 194 of the one way clutch 190 via an annular member 135.

The fourth intermediate shaft 30 is connected with the outside clutch member 123 of the third clutch 120 via a spline engagement 59 and is then further connected with the outside clutch member 113 of the second clutch 110 via the connecting member 54.

The third one way clutch 190 provided in the chamber space 10b comprises the above-mentioned outer race 194 mediating outside clutch member 133 of the fourth clutch 130 and the fifth clutch 140, and an inner race 192 mounted on the third intermediate shaft 28 by a spline engagement 76. The outer race 194 and the inner race 192 are rotatable relative to one another only in one rotational direction.

The fifth clutch 140 comprises an outside clutch member 143, an inside clutch member provided by the outer race 194 of the one way clutch 190, a set of multi-clutch plate elements 142 including a first group of plate elements torque transmittingly connected with the outside clutch member and a second group of plate elements torque transmittingly connected with the inside clutch member, and a servo actuating construction including a servo pressure chamber 144 and a servo piston 146. The fifth clutch 140 is engaged when the servo piston 146 is driven leftward in the figure. The outside clutch member 143 is torque transmittingly connected with the third intermediate shaft 28 via an annular member 78 mounted thereto by spline engagement 76 so as to be in a direct torque-transmitting relation with the sun gear 62 of the planetary gear assembly 60.

The outside clutch member 143 is formed also to provide a brake drum 145 of a second brake 200 which is formed as a band brake adapted to selectively impede rotation of the brake drum 145 by the band member designated also by 200.

The transmission mechanism constructed by the above-described clutches 100, 110, 120, 130 and 140, brakes 160 and 200, and one way clutches 170, 180 and 190 can provide five forward speed stages and one reverse stage by such selective engagement or disengagement of the clutches and the brakes as shown in the table at the end of the description. In the table, 0 indicates that the corresponding clutch or brake is engaged or the corresponding one way clutch comes into engagement for normal vehicle driving, 0 indicates that the corresponding clutch or brake is engaged for vehicle driving with availability of engine braking, and (0) indicates that the corresponding clutch or one way clutch may also be in engagement.

Further details with respect to the operation of this transmission are available, if desired, in the specification of Japanese Patent Application No. 1-25320 (1989).

Now, particularly referring to the structure related with the spline engagements 56 and 59 each being engagement of respective internal and external splines, the outside clutch member 123 is supported by a hub member 79 having a cylindrical portion 79a formed with splines at an internal periphery thereof, while an external periphery of the end portion of the fourth intermediate shaft 30 is formed with splines which are engaged with those of the hub member 79. Further, as shown as enlarged in FIG. 3, the inside clutch member 121 of the third clutch 120 has a cylindrical hub portion 121a formed with splines at internal periphery thereof for the spline engagement 56, while the corresponding end portion of the second intermediate shaft 26 is formed with splines at an external periphery thereof axially placed into engagement with those of the inside clutch member 121.

Figure 2:
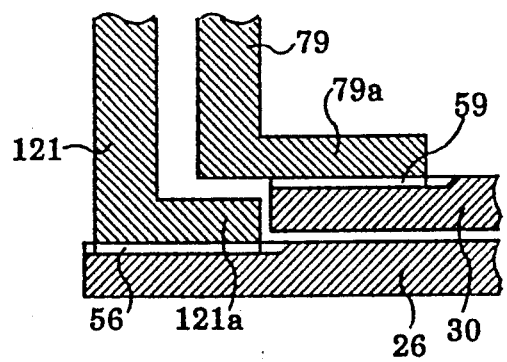
FIG. 2 is a partial longitudinal section showing a part of the structure shown in FIG. 1 in more detail.

In the embodiment shown in FIG. 1, or FIG. 2 in more detail, the cylindrical hub portion 121a of the inside clutch member 121 of the third clutch 120 is arranged to be substantially in axial alignment with the fourth intermediate shaft 30 with a tip portion thereof opposing an open end portion of said fourth intermediate shaft 30 as slightly radially inwardly shifted relative thereto by the outer diameter of the hub portion 121a being slightly smaller than the outer diameter of the fourth intermediate shaft member 30 so that the cylindrical hub portion 79a may extend beyond the open end of the fourth intermediate shaft 30 to overlap with certain clearance a part of the cylindrical hub portion 121a of the inside clutch member 121. In the embodiment shown in FIGS. 1 and 2 the hub portion 79a has a smaller inner diameter at the splined portion thereof closer to its tip portion thereof than at a root portion thereof axially extending out of engagement with the fourth intermediate shaft 30 as much as an amount substantially equal to two times of the radial height of the splines at 59. By this arrangement a radially and axially adjacent duplicate torque-transmitting connection is obtained in a compact construction by simply successively axially shifting the two telescoping hub members 79a and 121a relative to the two telescoping hollow shaft members 30 and 26.

Figure 3:
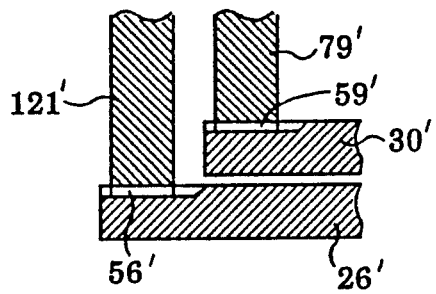
FIGS. 3, 4 and 5 are views similar to FIG. 2 showing alternative embodiments of the invention.
Figure 4:
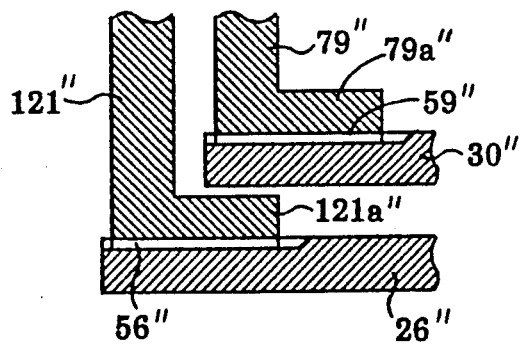
Figure 5:
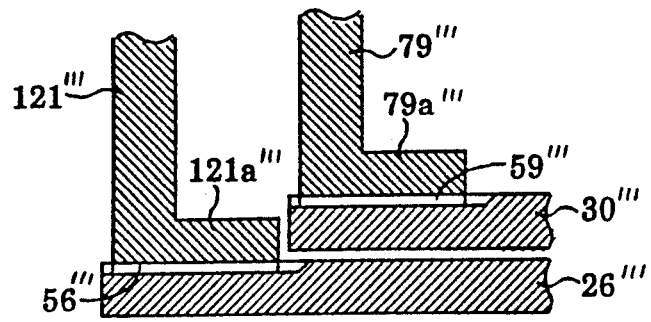

FIGS. 3, 4 and 5 show alternative embodiments of the duplicate torque-transmitting connection for the rotary members 26, 30, 79 and 121 similar to that shown in FIG. 2. In all of these alternative embodiments the assembly is again available by simple axial relative shifting of each two mutually torque transmittingly engaging members.

Although the invention has been shown and described with respect to some preferred embodiments thereof, it will be understood by those skilled in the art that various other modifications are possible without departing from the spirit of the invention.

TABLE

| | Clutches | | | | Brakes | | | One way | |
|---|---|---|---|---|---|---|---|---|---|
| | 100 | 110 | 120 | 130 | 140 | 160 | 200 | 170 | 180 | 190 |
| 1st speed | 0 | | | | 0 | 0 | | 0 | | 0 |

TABLE-continued

|  | Clutches | | | | Brakes | | | | One way | |
| --- | --- | --- | --- | --- | --- | --- | --- | --- | --- | --- |
|  | 100 | 110 | 120 | 130 | 140 | 160 | 200 | 170 | 180 | 190 |
| 2nd speed | 0 |  | 0 | 0 |  | 0 |  | 0 | 0 |  |
| 3rd speed | 0 | 0 |  | (0) | 0 |  |  | 0 |  | 0 |
| 4th speed | (0) | 0 | 0 | 0 | 0 |  |  |  | 0 | 0 |
| 5th speed |  | 0 | 0 | 0 |  |  | 0 |  | 0 |  |
| Reverse |  | 0 |  | (0) | 0 | 0 |  | (0) |  | (0) |

I claim:

1. A duplicate torque-transmitting connection for connecting a first and a second rotary member, each one of said first and second rotary members having a radial extension and being axially juxtaposed with respect to each other to rotate individually about a common axis with a first shaft member and a hollow second shaft member coaxially and telescopingly disposed around said first shaft member to be respectively in an individually torque-transmitting relationship in a transmission for a vehicle, comprising first external splines formed at an outer periphery of an end portion of said first shaft member axially extending out of an open end of said second shaft member, first internal splines formed at an inner periphery of a central bore formed in said first rotary member and engaged with said first external splines in an axial shifting relationship, second external splines formed at an outer periphery of an end portion of said second shaft member adjacent said open end thereof, and second internal splines formed at an inner periphery of a central bore formed in said second rotary member and engaged with said second external splines in an axial shifting relationship;

wherein said transmission comprises an input rotary member, an output rotary member, a first planetary gear assembly having a first sun gear, a first ring gear, a first set of planetary pinions meshing with both said first sun gear and said first ring gear, and a first carrier supporting said first planetary pinions, a second planetary gear assembly having a second sun gear, a second ring gear, a second set of planetary pinions meshing with both said second sun gear and said second ring gear, and a second carrier supporting said second planetary pinions, a third planetary gear assembly having a third sun gear, a third ring gear, a third set of planetary pinions meshing with both said third sun gear and said third ring gear, and a third carrier supporting said third planetary pinions, a first connecting member for torque-transmittingly connecting said first carrier with said third ring gear, a second connecting member for torque-transmittingly connecting said second ring gear with said third carrier, a third connecting member for torque-transmittingly connecting said second carrier with said third sun gear, a first clutch for selctively torque-transmittingly connecting said input rotary member with said first ring gear, a second clutch for selectively torque-transmittingly connecting said input rotary member with said first sun gear, a third clutch for selectively torque-transmittingly connecting said first sun gear with said second carrier as well as said third sun gear, a fourth clutch for selectively torque-transmittingly connecting said first sun gear with said second carrier as well as said third sun gear, a fifth clutch for selectively torque-transmittingly connecting said input rotary member with said second sun gear in series with said second clutch, a first brake for selectively braking rotation of said second carrier as well as said third sun gear, and a second brake for selectively braking rotation of said second sun gear, said output rotary member being torque-transmittingly connected with said second ring gear as well as said third carrier, said first shaft serving for torque-transmittingly connecting said first sun gear with said second carrier as well as said third sun gear through said third clutch, said second shaft member serving for torque-transmittingly connecting said first sun gear with said second carrier as well as said third sun gear through said fourth clutch.

2. A duplicate torque-transmitting connection according to claim 1, wherein said first rotary member has a cylindrical hub portion extending toward said second shaft member so as substantially axially to align thereto and oppose said open end of said second shaft member.

3. A duplicate torque-transmitting connection according to claim 2, wherein said hub portion of said first rotary member has an outer diameter smaller than an outer diameter of said second shaft member, and said second rotary member has a cylindrical hub portion extending in the same direction as said hub portion of said first rotary member so that said second rotary member is in the spline engagement with said second shaft member at a part of said hub portion thereof closer to a tip end thereof, while a root portion of said second rotary member axially opposite to said tip end of said hub portion thereof extends out of said open end of said second shaft member and telescopingly overlying a tip end portion of said hub portion of said first rotary member.

4. A duplicate torque-transmitting connection according to claim 3, wherein said hub portion of said second rotary member is formed with said internal splines only at an axial portion which overlies said second shaft member.

5. A duplicate torque-transmitting connection according to claim 4, wherein said hub portion of said rotary member has an inner diameter at said axial portion thereof where said internal splines are formed which is smaller than an inner diameter at said root portion thereof extending out of said open end of said second shaftr member as much as an amount substantially corresponding to two times of radial height of said internal splines thereof.

6. A duplicate torque-transmitting connection according to claim 1, wherein said first shaft member is a hollow shaft, and said first connceting member is passed through said first shaft member.

7. A duplicate torque-transmitting connection according to claim 6, wherein said second and thirst planetary gear assemblies are positioned on a first axial side of said first planetary gear assembly remote from said input rotary member and close to said output rotary member with said first and second clutches being on an axial side of said first planetary gear assembly remote from said second and third planetary gear assemblies while said third, fourth and fifth clutches and said first and second brakes are positioned axially between said first planetary gear assembly and a combination of said second and third planetary gear assemblies.

8. A duplicate torque-transmitting connection according to claim 7, wherein a first transverse support wall member is provided between said third clutch and said fourth clutch for rotationally supporting said second shaft member.

9. A duplicate torque-transmitting connection according to claim 8, wherein a hollow third shaft member is provided as coaxially and telescopingly disposed around said first shaft member as axially shafted from said second shaft member and serving for torque-transmitting connecting said input rotary member with said second sun gear in series with said second shaft member through said second and fifth clutches.

10. A duplicate torque-transmitting connection according to claim 9, wherein a second transverse support wall member is provided between said first brake ans said second brake for rotationally supporting said third shaft member.

11. A duplicate torque-transmitting connection according to claim 10, wherein said first shaft member is assembled of a first tubular element axially positioned to pass through said first support wall member and a second tubular element axially positioned to pass through said second support wall member, said first and second tubular elements being torque-transmittingly joined together at adjacent ends thereof.

12. A duplicate torque-transmitting connection according to claim 11, wherein a first one way clutch is provided so as to brake rotation of said second carrier as well as said third sun gear in one rotational direction thereof.

13. A duplicate torque-transmitting connection according to claim 12, wherein said first one way clutch has an inner race member which is supported by said second transverse support wall member.

14. A duplicate torque-transmitting connection according to claim 11, wherein a second one way clutch is provided between said fourth clutch and said first shaft member so as to allow transmittance of torque between said sun gear and said second carrier as well as said third sun gear when said fourth clutch is engaged only in one relatively rotational direction therebetween, said second one way clutch being axially positioned between said first and second transverse support wall members.

15. A duplicate torque-transmitting connection according to claim 14, wherein said first and second tubular elements are joined together at an axial position thereof radially overlapping with said second one way clutch so that said adjacent ends of said first and second tubular elements are telescoped with one another and an inner race member of said second one way clutch is engaged around an outer layer of the telescoped ends of said first and second tubular elements.

16. A duplicate torque-transmitting connection according to claim 11, wherein a third one way clutch is provided so as torque-transmittingly to connect said first sun gear with said second sun gear only in one relatively rotational direction therebetween, said third one way clutch being axially positioned between said first and second transverse support wall members.

17. A duplicate torque-transmitting connection according to claim 10, wherein said transmission comprises a housing having an integral axial end wall and open at another axial end, wherein all components of said transmission are adapted to be assembled into said housing in an axial direction of said housing from said open axial end thereof toward said integral axial end thereof.

18. A duplicate torque-transmitting connection according to claim 17, wherein said integral axial end is formed with a central opening for allowing said output rotary member to pass therethrough from an inside space of said housing to an outside thereof, said central opening serving to rotationally support said output rotary member, said output rotary member being formed with an axial bore portion serving as a bearing opening for rotationally supporting a first end portion of said first connecting member.

19. A duplicate torque-transmitting connection according to claim 18, wherein said open end of said housing is closed with an end cap member formed with a central opening for allowing said input rotary member to pass therethrough from an outside of said housing to an inside space thereof as rotationally supported thereby, and said input rotary member is formed with an axial bore portion serving as a bearing opening for rotationally supporting a second end portion of said first connecting member opposite to said first end portion thereof.

* * * * *